US010687238B2

(12) United States Patent
Lee et al.

(10) Patent No.: US 10,687,238 B2
(45) Date of Patent: Jun. 16, 2020

(54) METHOD FOR TRANSMITTING AN UPLINK PACKET DELAY MEASUREMENT REPORT IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 15/771,765

(22) PCT Filed: Sep. 5, 2016

(86) PCT No.: PCT/KR2016/009899
§ 371 (c)(1),
(2) Date: Apr. 27, 2018

(87) PCT Pub. No.: WO2017/073900
PCT Pub. Date: May 4, 2017

(65) Prior Publication Data
US 2019/0007855 A1  Jan. 3, 2019

Related U.S. Application Data

(60) Provisional application No. 62/249,339, filed on Nov. 1, 2015.

(51) Int. Cl.
*H04W 24/10* (2009.01)
*H04W 28/02* (2009.01)

(52) U.S. Cl.
CPC ....... *H04W 24/10* (2013.01); *H04W 28/0236* (2013.01); *H04W 28/0268* (2013.01); *H04W 28/0252* (2013.01)

(58) Field of Classification Search
CPC ............ H04W 24/10; H04W 28/0236; H04W 28/0268
See application file for complete search history.

(56) References Cited

U.S. PATENT DOCUMENTS

| 2015/0207712 A1* | 7/2015 | Fang ..................... H04L 43/106 370/252 |
| 2015/0263921 A1 | 9/2015 | Lee et al. |
| 2018/0084451 A1* | 3/2018 | Fukuta .................. H04W 24/10 |

OTHER PUBLICATIONS

Nokia Networks: "Queuing delay measurement," 3GPP TSG-RAN WG2 Meeting #91, Oct. 5-9, 2015, R2-154105.

(Continued)

*Primary Examiner* — Kent Krueger
(74) *Attorney, Agent, or Firm* — Dentons US LLP

(57) ABSTRACT

The present invention relates to a wireless communication system. More specifically, the present invention relates to a method and a device for transmitting an UL packet delay measurement report in a wireless communication system, the method comprising: receiving a measurement configuration including a measurement period and a plurality of sample thresholds configured for each QCI from an eNB, performing an UL packet delay measurement for a QCI based on queuing delays of a plurality of PDCP SDUs from radio bearers associated with the QCI during the measurement period, checking whether a number of the plurality of PDCP SDUs is larger than a sample threshold configured for the QCI among the plurality of sample thresholds, and transmitting an UL packet delay measurement report for the QCI including the QCI and a result of the UL packet delay measurement for the QCI to the eNB, if the number of the plurality of PDCP SDUs is larger than the sample threshold configured for the QCI.

12 Claims, 10 Drawing Sheets

(56) References Cited

OTHER PUBLICATIONS

LG Electronics Inc.: "Issues on reporting MDT measurement results per QCI," 3GPP TSG-RAN WG2 Meeting #91bis, Oct. 5-9, 2015, R2-154455.
Qualcomm Incorporated: "UL delay measurement," 3GPP TSG-RAN WG2 Meeting #91bis, Oct. 5-9, 2015, R2-154549.
Kyocera: "Configuration and report mechanism for UL PDCP queuing delay measurement," 3GPP TSG-RAN WG2 #91bis, Oct. 5-9, 2015, R2-154685.

* cited by examiner

[Figure 1]
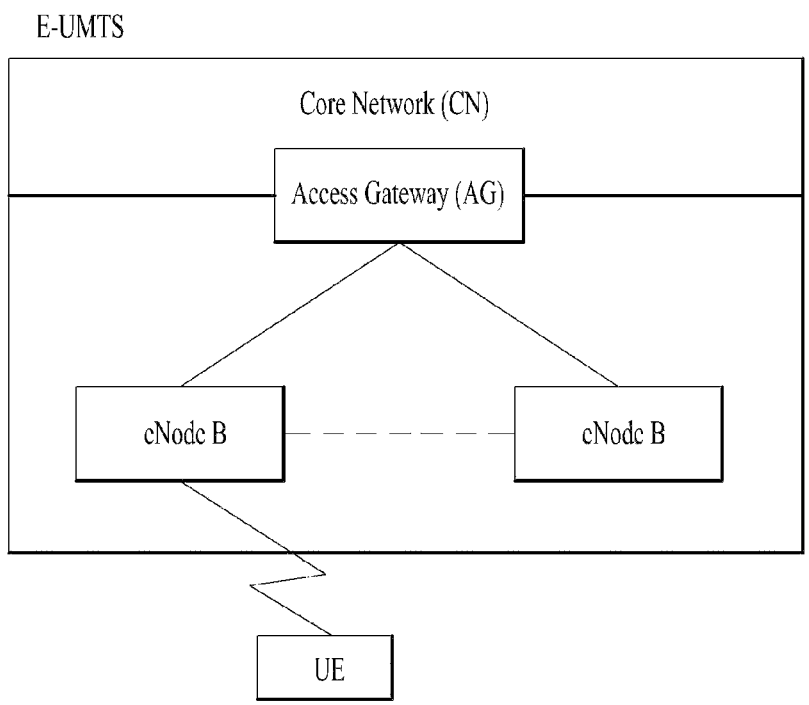

【Figure 2A】
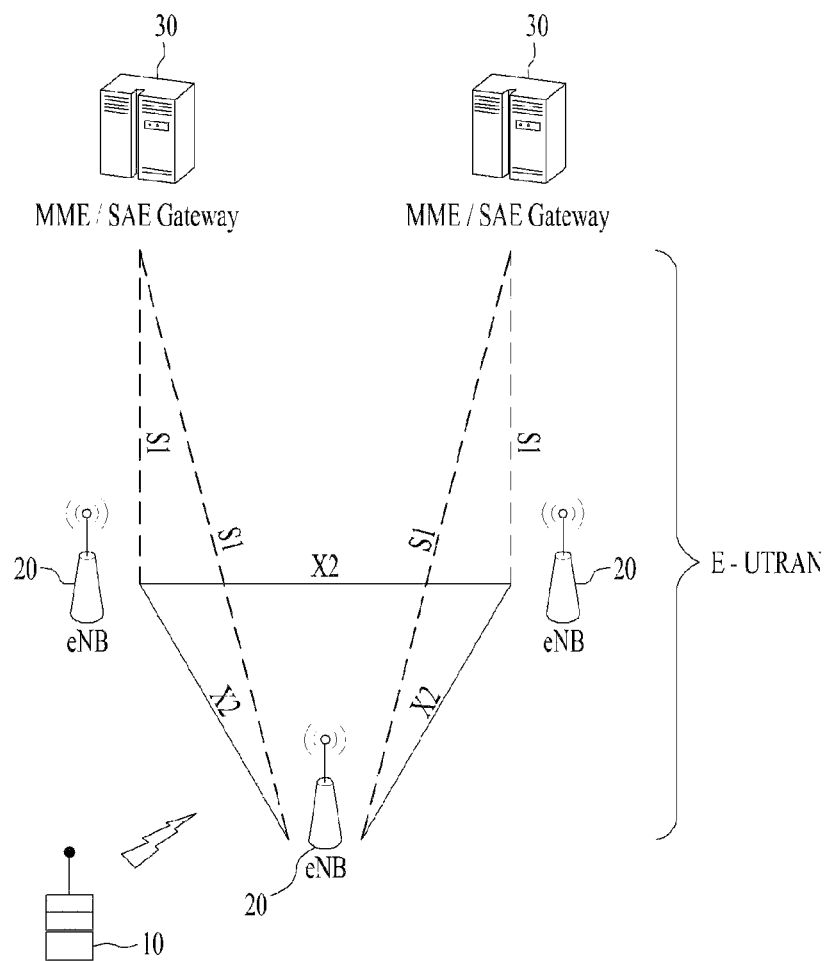

【Figure 2B】
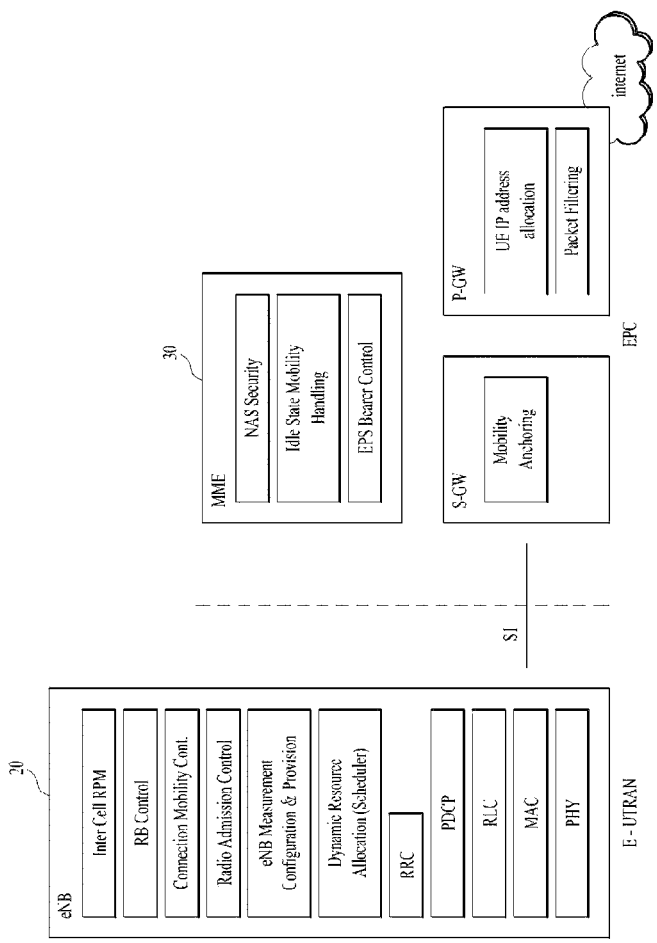
【Figure 3】
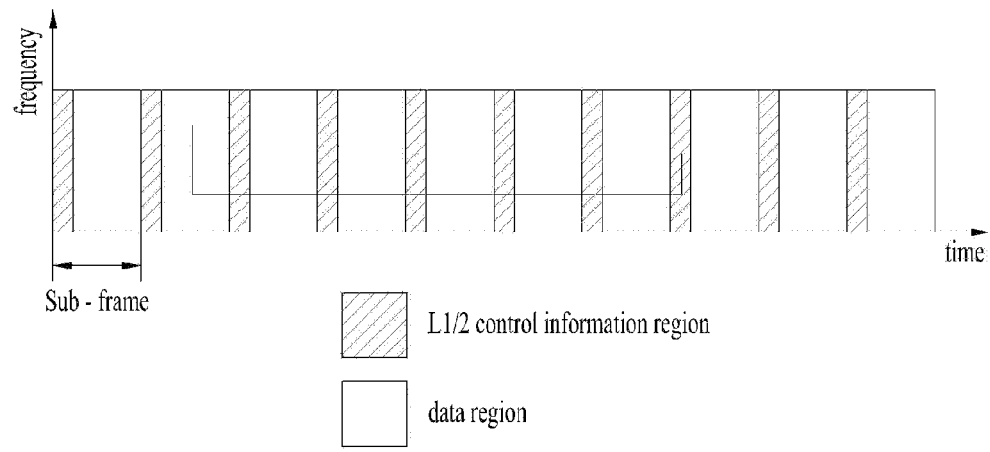

【Figure 4】
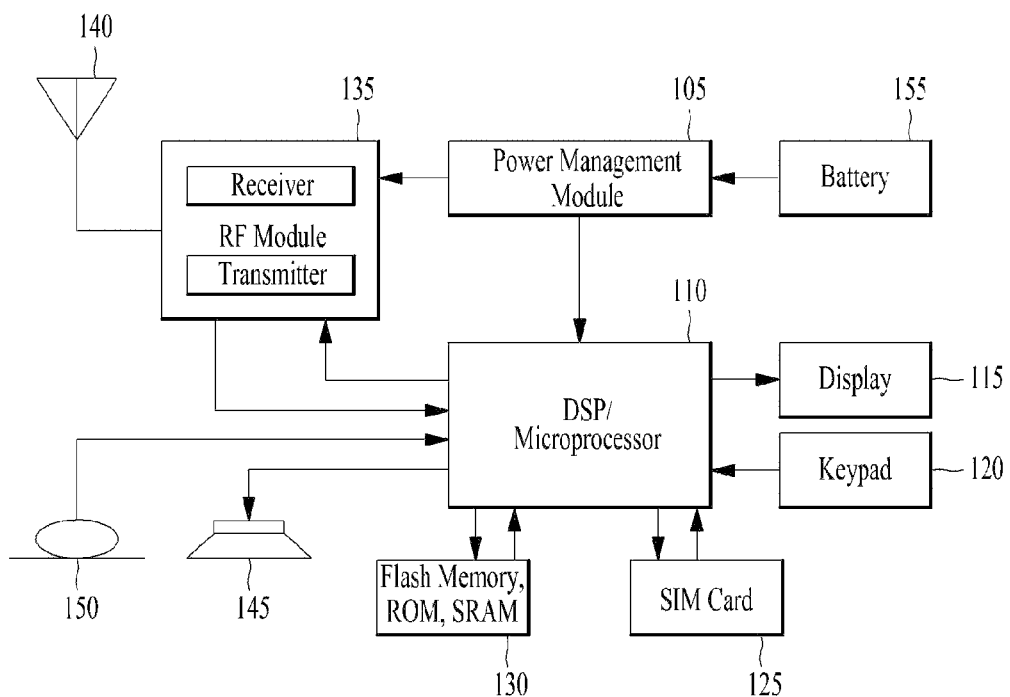

【Figure 5】
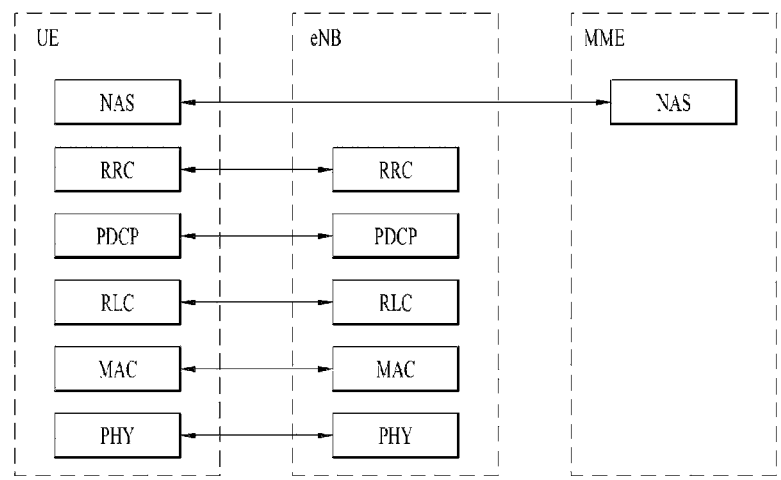
(a) Control-Plane Protocol Stack
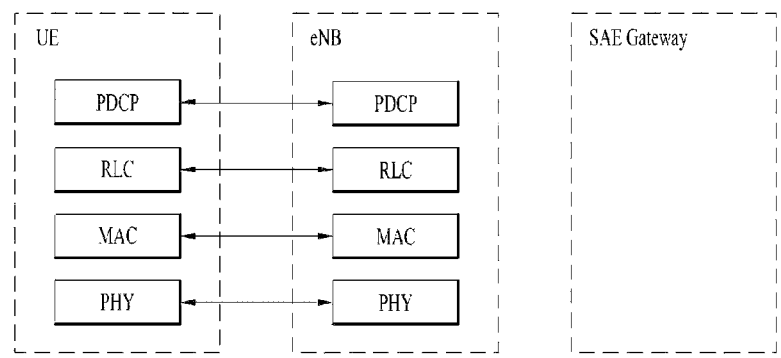
(b) User-Plane Protocol Stack

[Figure 6]
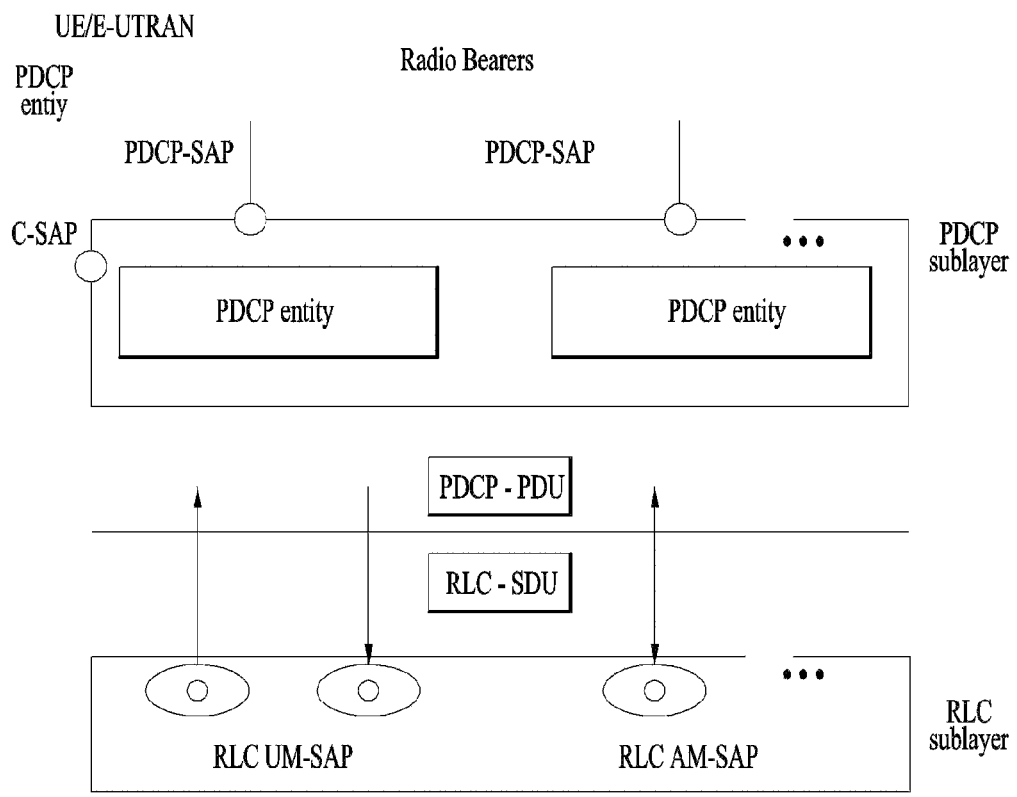

[Figure 7]
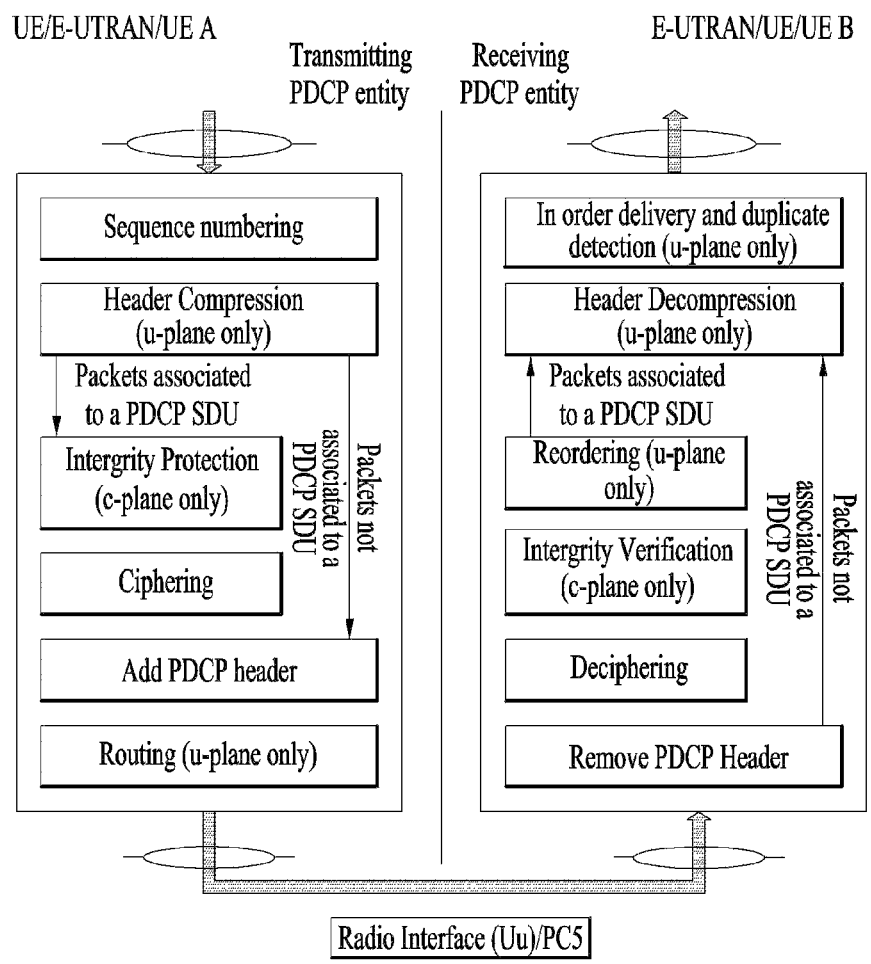

【Figure 8A】
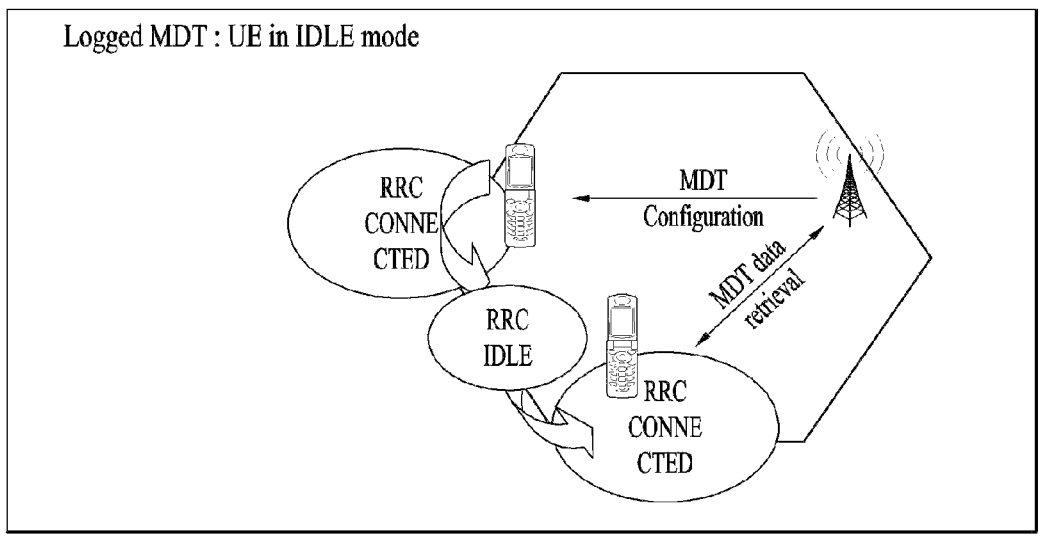

【Figure 8B】
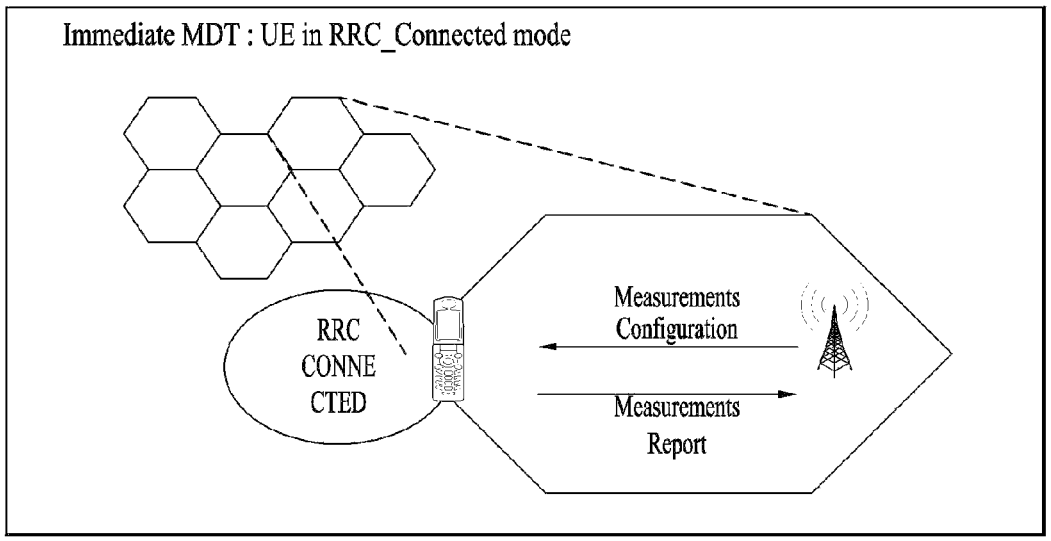
【Figure 9】
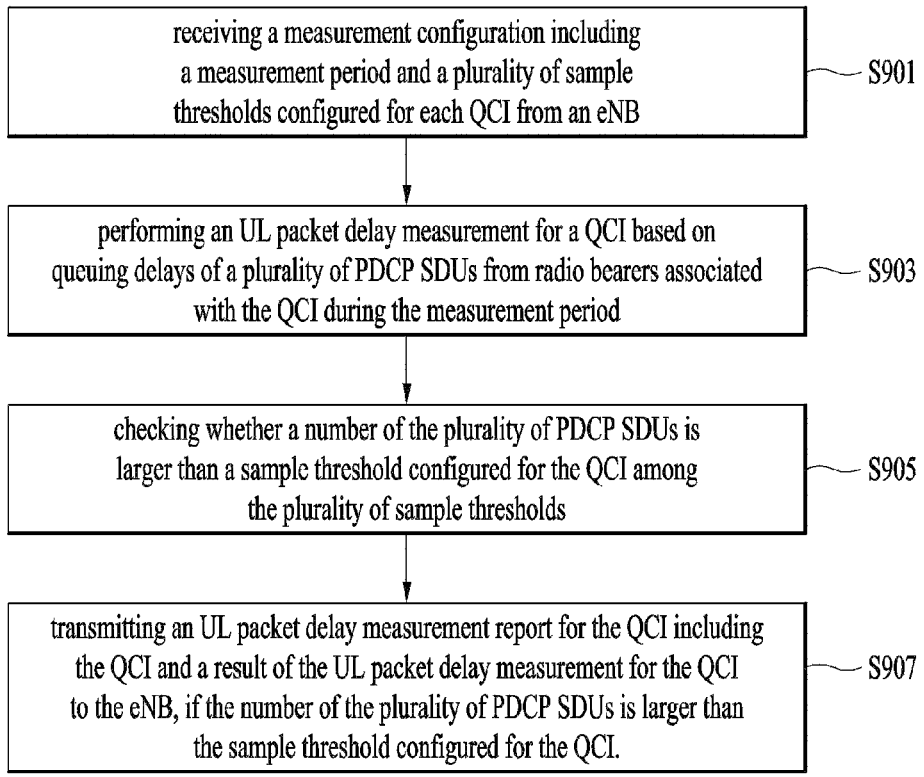

【Figure 10】

| QCI | excess packet delay ratio | average queuing delay value |
|---|---|---|
| QCI 2 | 0.2 | 200 ms |

METHOD FOR TRANSMITTING AN UPLINK PACKET DELAY MEASUREMENT REPORT IN A WIRELESS COMMUNICATION SYSTEM AND A DEVICE THEREFOR

This application is a 35 use § 371 national stage entry of international application no. PCT/KR2016/009899 filed on Sep. 5, 2016, and claims priority to U.S. provisional application No. 62/249,339 filed on Nov. 1, 2015, all of which are hereby incorporated by reference in their entireties as if fully set forth herein.

TECHNICAL FIELD

The present invention relates to a wireless communication system and, more particularly, to a method for transmitting an uplink (UL) packet delay measurement report in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting an UL packet measurement report in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In order to increase a reliability of an UL packet delay measurement report, it is invented that a UE checks whether an UL packet delay measurement result is obtained from enough number of samples, and the UE reports the UL packet delay measurement result to an eNB if it is obtained from enough number of samples.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a view showing an example of a physical channel structure used in an E-UMTS system;

FIG. 4 is a block diagram of a communication apparatus according to an embodiment of the present invention;

FIG. 5 is a diagram showing a control plane and a user plane of a radio interface protocol between a UE and an E-UTRAN based on a 3rd generation partnership project (3GPP) radio access network standard;

FIG. 6 is a conceptual diagram for a PDCP entity architecture;

FIG. 7 is a conceptual diagram for functional view of a PDCP entity;

FIG. 8A is a conceptual diagram for Logged MDT, and FIG. 8B is a conceptual diagram for Immediate MDT;

FIG. 9 is conceptual diagram for a UE operation regarding an UL packet delay measurement report for a QCI according to an exemplary embodiment of the present invention; and FIG. 10 shows an example of reporting an UL packet delay measurement in consideration of sample thresholds according to an exemplary embodiment of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 3, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 4 is a block diagram of a communication apparatus according to an embodiment of the present invention.

The apparatus shown in FIG. 4 can be a user equipment (UE) and/or eNB adapted to perform the above mechanism, but it can be any apparatus for performing the same operation.

As shown in FIG. 4, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 4 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 4 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 5 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 6 is a conceptual diagram for a PDCP entity architecture.

FIG. 6 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

FIG. 7 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 7 represents the functional view of the PDCP entity for the PDCP sublayer; it should not restrict implementation. The figure is based on the radio interface protocol architecture.

At reception of a PDCP service data unit (SDU) from upper layers, the UE may start a discardTimer associated with this PDCP SDU. A transmitting side of each PDCP entity for DRBs may maintain the discardTimer. The duration of the discardTimer is configured by upper layers. In the transmitter, a new timer is started upon reception of a PDCP SDU from an upper layer. For a PDCP SDU received from upper layers, the UE may associate the PDCP sequence number (SN) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer. If the Next_PDCP_TX_SN is greater than Maximum_PDCP_SN, the Next_PDCP_TX_SN is set to '0' and TX_HFN is incremented by one.

When the discard timer expires for a PDCP SDU, or the successful delivery of a PDCP SDU is confirmed by PDCP status report, the UE may discard the PDCP SDU along with the corresponding PDCP PDU. If the corresponding PDCP PDU has already been submitted to lower layers the discard is indicated to lower layers. The transmitting side of each PDCP entity for DRBs may maintain the discard timer. The duration of the timer is configured by upper layers. In the transmitter, a new timer is started upon reception of an SDU from upper layer.

FIG. 8A is a conceptual diagram for Logged MDT, and FIG. 8B is a conceptual diagram for Immediate MDT.

In wireless mobile networks quality of user experience changes dynamically and depends on large variety of factors. Because of that mobile operators are willing to timely and effectively evaluate provided Quality of Service (QoS) in their networks. Nowadays the main tool for monitoring network state and performance is drive testing. To replace this expensive and mostly manual procedure, concept of Minimization of Drive Tests (MDT) is being developed in 3GPP LTE standardization.

MDT is about UE measurement collection for off-line processing. No automatic mechanism is defined MDT. The MDT mode includes 2 modes for MDT measurements: Logged MDT and Immediate MDT.

The Immediate MDT is that a MDT functionality involving measurements performed by the UE in CONNECTED state and reporting of the measurements to eNB/radio network controller (RNC) available at the time of reporting condition as well as measurements by the network for MDT purposes. The Logged MDT is a MDT functionality involving measurement logging by UE in IDLE mode, CELL_paging channel (CELL_PCH), UTRAN registration area_PCH (URA_PCH) states and CELL_forward access channel (CELL_FACH) state when second DRX cycle is used (when UE is in UTRA) for reporting to eNB/RNC at a later point in time, and logging of MBSFN measurements by E-UTRA UE in IDLE and CONNECTED modes.

MDT measurements may include packet delay measurement, packet discard rate measurement, and packet loss rate measurement.

Packet Delay in DL per QCI refers to packet delay for DRBs. The objective of this measurement is to measure L2 Packet Delay for operations and maintenance (OAM) performance observability or for QoS verification of MDT. For arrival of packets the reference point is PDCP upper service access point (SAP). For successful reception the reference point is MAC lower SAP. The Detailed Definition and explanations of the Packet Delay in DL per QCI can be found in Math FIG. 1 and Table 1 below.

$$M(T, qci) = \left[ \frac{\sum_{\forall i} tAck(i) - tArriv(i)}{I(T)} \right] \quad \text{[Math FIG. 1]}$$

TABLE 1

| | |
|---|---|
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

Packet Discard Rate in DL per QCI refers to discard for DRBs. The objective of this measurement is to measure packets that are dropped due to congestion, traffic management etc, for OAM performance observability. One packet corresponds to one PDCP SDU. The reference point is PDCP upper SAP. The Detailed Definition and explanations of the Packet Discard Rate in DL per QCI can be found in Math FIG. 2 and Table 2 below.

$$M(T, qci) = \left\lfloor \frac{Ddisc(T, qci) * 1000000}{N(T, qci)} \right\rfloor \quad \text{[Math FIG. 2]}$$

TABLE 2

| | |
|---|---|
| M(T, qci) | Packet Discard Rate in the DL per QCI, averaged during time period T. Unit: number of discarded packets per received packets * $10^6$, Integer. |
| Ddisc(T, qci) | Number of DL packets, for which no part has been transmitted over the air, of a data radio bearer with QCI = qci, that are discarded during time period T in the PDCP, RLC or MAC layers due to reasons other than hand-over. |
| N(T, qci) | Number of DL packets of bearer with QCI = qci that has entered PDCP upper SAP during time period T (NOTE). |
| T | Time Period during which the measurement is performed, Unit; minutes (NOTE). |

It is noted that packet loss is expected to be small or very small. The statistical accuracy of an individual discard rate measurement result is dependent on how many packets has been received, and thus the time for the measurement.

Packet Uu Loss Rate in DL per QCI refers to packet loss for DRBs. The objective of this measurement is to measure packets that are lost at Uu transmission, for OAM performance observability. One packet corresponds to one PDCP SDU. The Detailed Definition and explanations of the Packet Uu Loss Rate in DL per QCI can be found in Math FIG. 3 and Table 3 below.

$$M(T, qci) = \left\lfloor \frac{Dloss(T, qci) * 1000000}{N(T, qci) + Dloss(T, qci)} \right\rfloor \quad \text{[Math FIG. 3]}$$

TABLE 3

| | |
|---|---|
| M(T, qci) | Packet Uu Loss Rate in the DL per QCI. Unit: number of lost packets per transmitted packets * $10^6$, Integer. |
| Dloss(T, qci) | Number of DL packets, of a data radio bearer with QCI = qci, for which at least a part has been transmitted over the air but not positively acknowledged, and it was decided during time period T that no more transmission attempts will be done. If transmission of a packet might continue in another cell, it shall not be included in this count. |
| N(T, qci) | Number of DL packets, of a data radio bearer with QCI = qci, which has been transmitted over the air and positively acknowledged during time period T. |
| T | Time Period during which the measurement is performed, Unit: minutes (NOTE). |

It is noted that packet loss is expected to be upper bounded by the Packet Error Loss Rate (PELR) of the QCI which takes values between $10^{-6}$ and $10^{-2}$. The statistical accuracy of an individual packet loss rate measurement result is dependent on how many packets have been received, and thus the time for the measurement.

Packet Loss Rate in UL per QCI refers to packet loss for DRBs. The objective of this measurement is to measure packets that are lost in the UL, for OAM performance observability.

One packet corresponds to one PDCP SDU. Reference point is the PDCP upper SAP. The Detailed Definition and explanations of the Packet Loss Rate in UL per QCI can be found in Math FIG. 4 and Table 4 below.

$$M(T, qci) = \left\lfloor \frac{Dloss(T, qci) * 1000000}{N(T, qci)} \right\rfloor \quad \text{[Math FIG. 4]}$$

TABLE 4

| | |
|---|---|
| M(T, qci) | Packet Loss Rate in the UL per QCI. Unit: number of lost packets per transmitted packets * $10^6$, Integer. |
| Dloss(T, qci) | Number of missing UL PDCP sequence numbers, representing packets that are not delivered to higher layers, of a data radio bearer with QCI = qci during time period T. If transmission of a packet might continue in another cell, it shall not be included in this count. |
| N(T, qci) | Total number of UL PDCP sequence numbers (also including missing sequence numbers) of a bearer with QCI = qci, starting from the sequence number of the first packet delivered by PDCP upper SAP to higher layers until the sequence number of the last packet during time period T. |
| T | Time Period during which the measurement is performed, Unit: minutes (NOTE). |

It is noted that packet loss is expected to be upper bounded by the PELR of the QCI which takes values between $10^{-6}$ and $10^{-2}$. The statistical accuracy of an individual packet loss rate measurement result is dependent on how many packets have been received, and thus the time for the measurement.

Measurements in MDT, such as measurements discussed above, may be performed separately per QoS Class Identifier (QCI). QCI defines a Quality of Service (QoS) level for a radio bearer so that the radio bearers with the same QCI would be treated in a similar way regardless of manufacturers/operators.

Meanwhile, there are some agreements regarding an UL packet delay measurement report as followings: Agreement (i), The delay measurement reporting is periodical where the reporting periodicity is the measurement period; and Agreement (ii), The measurement result is converted into a ratio of packet delays exceeding a configured threshold and the total number of packets during the measurement/reporting period.

According to the Agreement (ii), it is possible to show how many packets have experienced excessive delay among the total number of packets. This would help for operators to detect the poor service, i.e. delay spike, in multimedia telephony service (MMTEL) voice/video.

However, if the UL packet delay measurement report includes only information about ratio of excessive delayed packets, it may not provide sufficient delay information for overall QoS of MMTEL voice/video traffic. In other words, the reliability of the ratio depends on the number of measured packets. For example, if the number of measured packets is small, the ratio may not give meaningful information. Assuming that there are only 3 PDCP SDUs from a radio bearer (RB) in the measurement period and one of them is above delay threshold. In this case, the ratio is 0.33, but it should not be considered as typical delay spike of this RB. Reporting the ratio in this case would not be helpful for measuring delay spike.

Let's take a more specific example of two measurement results as follows: i) result of Measurement 1 (M1) includes ratio of excessive delayed packets=0.1 and average delay=400 ms, and ii) result of Measurement 2 (M2) includes ratio of excessive delayed packets=0.2 and average delay=200 ms. For each measurement result, a ratio of excessive delayed packets and an average delay of the packets are calculated as above. It is assumed that a delay threshold, i.e. delay TH, is set to 500 ms. If each measurement result only includes the ratio of excessive delayed packets, it seems as if M1 (0.1) is better than M2 (0.2). However, the average delay of M2 (200 ms) is much less than M1 (400 ms), and thus M2 is better than M1 from overall delay perspective.

In summary, if the UL packet delay measurement report includes only information about ratio of excessive delayed packets, it may not provide sufficient delay information.

Thus, in the present invention, it is invented that when the reporting of the UL packet delay measurement is triggered, the UE checks whether an UL packet delay measurement result is obtained from enough number of samples (i.e., the number of PDCP SDUs which is considered for the measurement). If it is obtained from enough number of samples, the UE considers the UL packet delay measurement result is meaningful, and the UE reports the UL packet delay measurement result to the eNB. Otherwise, if it is obtained from not enough number of samples, the UE considers the UL packet delay measurement result is not meaningful and the UE does not report the UL packet delay measurement result to the eNB. Or, the UE reports the UL packet delay measurement result to the eNB with indication that it is obtained from less number of samples.

The UE considers that the UL packet delay measurement result is obtained from enough number of samples if the number of samples is above the sample threshold. The samples correspond to PDCP SDUs of radio bearers with same QCI measured during each measurement period.

The UE may receive measurement configuration via RRC message from the eNB, or the measurement configuration may be pre-defined for the UE. The measurement configuration may include i) MDT measurement period (in unit of ms or subframes), ii) Delay threshold (in unit of ms or subframes), and iii) Sample threshold.

The MDT measurement period indicates the time interval of measuring PDCP queuing delay of PDCP SDUs. The delay threshold indicates the threshold of PDCP queuing delay, and the delay threshold may be configured per QCI. The sample threshold indicates the minimum number of PDCP SDUs that the UE can consider the measurement result is meaningful. The sample threshold may be configured per radio bearer, per QCI or per UE.

According to the measurement configuration, the UE measures PDCP queuing delay for each PDCP SDU by measuring a time duration between a time point when a PDCP SDU arrives at PDCP upper SAP and a time point when the PDCP SDU is delivered to lower layer (i.e., a RLC entity or a MAC entity).

The UE may obtain a ratio of excessive delayed PDCP SDUs per QCI. The ratio of excessive delayed PDCP SDUs can be obtained by counting the number of PDCP SDUs of radio bearers with same QCI whose PDCP queuing delay is above the delay threshold measured during the corresponding MDT measurement period, and calculating the ratio of excessive delayed PDCP SDUs of the corresponding QCI by dividing the counting result by the total number of PDCP SDUs of radio bearers with same QCI measured during the corresponding MDT measurement period.

In addition, the UE may obtain an average PDCP queuing delay per QCI. The average PDCP queuing delay can be obtained by summing up the PDCP queuing delay of PDCP SDUs of radio bearers with same QCI measured during corresponding MDT measurement period, and calculating the average PDCP queuing delay of the corresponding QCI by dividing the summing result by the total number of PDCP SDUs of radio bearers with same QCI measured during the corresponding MDT measurement period.

After that, the UE may transmit an UL packet delay measurement result to the eNB. The UL packet delay measurement result may include a QCI value, and at least one of ratio of excessive delayed PDCP SDUs of corresponding QCI value and average PDCP queuing delay of corresponding QCI value. The UL packet delay measurement result can include multiple QCI values and the corresponding ratio of excessive delayed PDCP SDUs and/or average PDCP queuing delay. The UL packet delay measurement result can be transmitted by RRC/PDCP/RLC/MAC/PHY signaling.

Meanwhile, the reporting of the UL packet delay measurement result may be triggered when i) at the end of MDT measurement period, ii) PDCP queuing delay of a PDCP SDU from radio bearers of same QCI is above the delay threshold, or iii) the number of PDCP SDUs of radio bearers with same QCI measured during corresponding MDT measurement period is above the sample threshold.

When the reporting of the UL packet delay measurement result is triggered, the UE transmits the UL packet delay measurement result to the eNB if the number of PDCP SDUs of radio bearers with same QCI measured during corresponding MDT measurement period is above the sample threshold.

Else, if the number of PDCP SDUs of radio bearers with same QCI measured during corresponding MDT measurement period is less than the sample threshold, the UE transmits the Measurement Result to the eNB including an indication that the number of PDCP SDUs of radio bearer with same QCI is less than the sample threshold. The indication may be an 1 bit indication, or may be a special value (e.g., 0 or infinity) of the ratio of excessive delayed PDCP SDUs or the average PDCP queuing delay. Or, the UE may not transmit the Measurement Result to the eNB. The UE may discard the corresponding Measurement Result.

More specific mechanisms for reporting UL queuing delay measurement according to the present invention will be introduced with reference to FIGS. 9 and 10.

FIG. 9 is conceptual diagram for a UE operation regarding an UL packet delay measurement report for a QCI according to an exemplary embodiment of the present invention.

In FIG. 9, a method for an UL packet delay measurement report per QCI will be described, but the inventive concept is not limited thereto. For example, the UL packet delay measurement report can be performed per RB.

Referring to FIG. 9, the UE receives a measurement configuration including a measurement period and a plurality of sample thresholds configured for each QCI from an eNB (S901). In some embodiments, the measurement configuration may further include a delay threshold. Here, sample thresholds are respectively configured for each QCI. However, sample threshold(s) for the UE can be configured per RB or per UE. The delay threshold may be configured per QCI.

After receiving the measurement configuration, the UE may perform UL packet delay measurements for each QCI. For one QCI, the UE performs an UL packet delay measurement for a QCI based on queuing delays of a plurality of PDCP SDUs from radio bearers associated with the QCI during the measurement period (S903).

In some embodiments, a result of the UL packet delay measurement for the QCI may correspond to an excess packet delay ratio for the QCI. In this case, the UL packet delay measurement for the QCI is performed by counting a number of PDCP SDUs whose queuing delay is larger than the delay threshold among the plurality of PDCP SDUs, and calculating an excess packet delay ratio by dividing the counted number of PDCP SDUs by the number of all of the plurality of PDCP SDUs.

In some embodiments, a result of the UL packet delay measurement for the QCI may correspond to an average queuing delay value for the QCI. In this case, the UL packet delay measurement for the QCI is performed by summing up the queuing delays of each of the plurality of PDCP SDUs, and calculating an average queuing delay value by dividing the summing result by the number of the plurality of PDCP SDUs.

After performing UL packet delay measurements for each QCI, the UE checks whether a number of PDCP SDUs associated with each QCI is larger than a sample threshold corresponding each QCI. For one QCI, the UE checks whether a number of the plurality of PDCP SDUs, which are from radio bearers associated with the QCI during the measurement period, is larger than a sample threshold configured for the QCI among the plurality of sample thresholds (S905).

Meanwhile, in the present exemplary embodiment, the plurality of sample thresholds are respectively configured for each QCI. However, as discuss above, sample threshold (s) for the UE can be configured per RB or per UE. If sample thresholds are configured per RB, the UE may perform UL packet delay measurements for each RB, and may check whether a number of PDCP SDUs associated with each RB is larger than a sample threshold corresponding each RB. If sample thresholds are configured per UE, the plurality of sample thresholds for each QCI may have the same value.

Meanwhile, the checking may be performed when transmission of an UL packet delay measurement report is triggered.

In some embodiments, the transmission of the UL packet delay measurement report for the QCI is triggered at the end of the measurement period, or when an average queuing delay value is above a certain value (i.e., the delay threshold).

After the checking, if the number of the plurality of PDCP SDUs is larger than the sample threshold configured for the QCI, the UE transmits an UL packet delay measurement report for the QCI including the QCI and a result of the UL packet delay measurement for the QCI to the eNB (S907). In contrast, if the number of the plurality of PDCP SDUs is less than or equal to the sample threshold configured for the QCI, the UE does not transmit the UL packet delay measurement report for the QCI. Or, if the number of the plurality of PDCP SDUs is less than or equal to the sample threshold configured for the QCI, the UL packet delay measurement report for the QCI further includes an indication which indicates that the number of the plurality of PDCP SDUs is less than or equal to the sample threshold configured for the QCI. Here, a field length of the indication may be 1 bit. More specific examples for reporting an UL packet measurement will be showed in FIG. 10.

FIG. 10 shows an example of reporting an UL packet delay measurement in consideration of sample thresholds according to an exemplary embodiment of the present invention.

In descriptions with reference to FIG. 10, it is assumed that a UE is configured with 3 radio bearers. Identifiers of radio bearers and QCI of corresponding radio bearer are assumed as follows: i) Radio bearer 1=QCI 1, ii) Radio bearer 2=QCI 1, iii) Radio bearer 3=QCI 2. That is, QCI 1 is associated with RB 1 and RB 2, and QCI 2 is associated with RB 3.

The UE may receive measurement configuration via RRC message from an eNB. The measurement configuration includes a MDT measurement period (700 ms), a threshold of PDCP queuing delay for QCI 1 (i.e. delay_TH 1=500 ms), a threshold of PDCP queuing delay for QCI 2 (i.e. delay_TH 2=400 ms), a sample threshold indicating the minimum number of PDCP SDUs that the UE can consider the Measurement Result is meaningful for QCI 1 (i.e. N_TH 1=200), a sample threshold indicating the minimum number of PDCP SDUs that the UE can consider the Measurement Result is meaningful for QCI 2 (i.e. N_TH 2=300).

After that, the UE measures PDCP queuing delay for each PDCP SDU by measuring a time duration between a time point when a PDCP SDU arrives at PDCP upper SAP and a time point when the PDCP SDU is delivered to RLC during the MDT measurement period.

Then, the UE obtains excess packet delay ratios for each QCI. More specifically, the UE counts the number of PDCP SDUs of radio bearers with same QCI whose PDCP queuing delay is above delay_TH measured during MDT measurement period, and obtains the excess packet delay ratios for each QCI by dividing the counting result by the total number of PDCP SDUs of radio bearers with same QCI measured during MDT measurement period. And the UE obtains average queuing delay values for each QCI. More specifically, the UE sums up the PDCP queuing delay of PDCP SDUs of radio bearers with same QCI measured during MDT measurement period, and obtains the average queuing delay values for each QCI by dividing the summing result by the total number of PDCP SDUs of radio bearers with same QCI measured during MDT measurement period.

Table 5 shows an example of the number of PDCP SDUs of radio bearers measured during the MDT measurement period for each QCI, corresponding excess packet delay ratio, and corresponding average queuing delay value.

TABLE 5

| QCI | The number of PDCP SDUs of radio bearers measured during the MDT measurement period | excess packet delay ratio | average queuing delay value |
|---|---|---|---|
| QCI 1 | 150 | 0.1 | 400 ms |
| QCI 2 | 350 | 0.2 | 200 ms |

At the end of the MDT measurement period, the reporting of measurement result may be triggered, and the UE reports measurement result, as shown in FIG. 10. In FIG. 10, only measurement result regarding QCI 2 is reported but measurement result regarding QCI 1 is not reported.

More specifically, for QCI 1, the number of PDCP SDUs of radio bearers with QCI 1 measured during the MDT measurement period (150, as shown in Table 5) is less than a sample threshold associated with QCI 1 (i.e., N_TH 1=200). So, the UE considers that the Measurement Result is not meaningful. The UE does not transmit the Measurement Result to the eNB and discard the corresponding Measurement Result. For QCI 2, the number of PDCP SDUs of radio bearers with QCI 2 measured during the MDT measurement period (350, as shown in Table 5) is above N_TH 2(300). So, the UE considers that the Measurement Result is meaningful, and the UE reports the Measurement Result to the eNB by RRC signal including set of QCI value (i.e., QCI 2), the excess packet delay ratio (i.e., 0.2) and the average queuing delay value (i.e., 200 ms).

According to the present exemplary embodiment, it is possible to increase a reliability of UL packet delay measurement report.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
receiving a measurement configuration including a measurement period and a sample threshold from an eNode-B (eNB);
performing an uplink (UL) packet delay measurement based on queuing delays of a plurality of packet data convergence protocol service data units (PDCP SDUs);
checking whether a number of the plurality of PDCP SDUs is larger than the sample threshold;
based on the number of the plurality of PDCP SDUs being larger than the sample threshold, transmitting an UL packet delay measurement report including a result of the UL packet delay measurement to the eNB; and
based on the number of the plurality of PDCP SDUs being less than or equal to the sample threshold, holding a transmission of an UL packet delay measurement report.

2. The method according to claim 1, further comprising:
triggering the transmission of the UL packet delay measurement report, wherein checking the number of PDCP SDUs is performed based on the transmission of the UL packet delay measurement report being triggered.

3. The method according to claim 2, wherein the transmission of the UL packet delay measurement report is triggered at the end of the measurement period.

4. The method according to claim 1, wherein the measurement configuration further includes a delay threshold, and the UL packet delay measurement is performed based on:
counting a number of PDCP SDUs whose queuing delay is larger than the delay threshold among the plurality of PDCP SDUs; and
calculating an excess packet delay ratio based on dividing the counted number of PDCP SDUs by the number of all of the plurality of PDCP SDUs.

5. The method according to claim 1, wherein the UL packet delay measurement is performed by:
summing up the queuing delays of each of the plurality of PDCP SDUs; and
calculating an average queuing delay value by dividing the summing result by the number of the plurality of PDCP SDUs.

6. The method according to claim 5, wherein the transmission of the UL packet delay measurement report is triggered based on the average queuing delay value being larger than a certain value.

7. A User Equipment (UE) for operating in a wireless communication system, the UE comprising:
a transceiver; and
a processor that:
receives a measurement configuration including a measurement period and a sample threshold from an eNode-B (eNB),
performs an uplink (UL) packet delay measurement based on queuing delays of a plurality of packet data convergence protocol service data units (PDCP SDUs),
checks whether a number of the plurality of PDCP SDUs is larger than the sample threshold,
based on the number of the plurality of PDCP SDUs being larger than the sample threshold, transmits an UL packet delay measurement report including a result of the UL packet delay measurement to the eNB, and based on the number of the plurality of PDCP SDUs being less than or equal to the sample threshold, holds a transmission of an UL packet delay measurement report.

8. The UE according to claim 7,
wherein the processor further triggers the transmission of the UL packet delay measurement report, and
wherein checking the number of PDCP SDUs is performed based on the transmission of the UL packet delay measurement report being triggered.

9. The UE according to claim 8, wherein the transmission of the UL packet delay measurement report is triggered at the end of the measurement period.

10. The UE according to claim 7, wherein the measurement configuration further includes a delay threshold, and the UL packet delay measurement is performed based on:

counting a number of PDCP SDUs whose queuing delay is larger than the delay threshold among the plurality of PDCP SDUs; and
calculating an excess packet delay ratio based on dividing the counted number of PDCP SDUs by the number of all of the plurality of PDCP SDUs.

11. The UE according to claim 7, wherein the UL packet delay measurement is performed by:
summing up the queuing delays of each of the plurality of PDCP SDUs; and
calculating an average queuing delay value by dividing the summing result by the number of the plurality of PDCP SDUs.

12. The UE according to claim 11, wherein the transmission of the UL packet delay measurement report is triggered based on the average queuing delay value being larger than a certain value.

* * * * *